Oct. 24, 1944.  A. MARMOR  2,361,305
FIRE ENGINE CONTROL DEVICE
Filed May 1, 1942  2 Sheets-Sheet 1
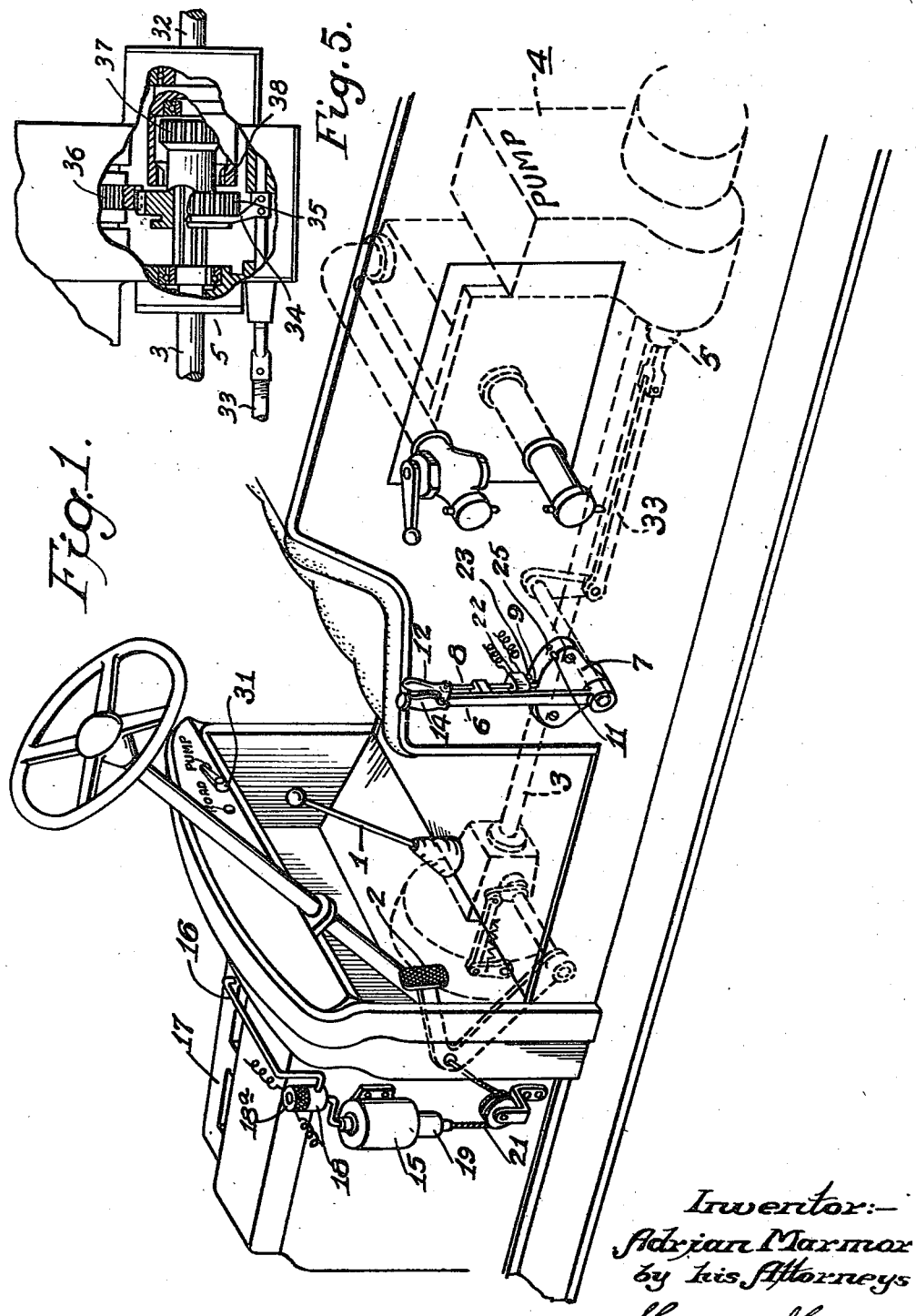
Inventor:—
Adrian Marmor
by his Attorneys
Howson & Howson

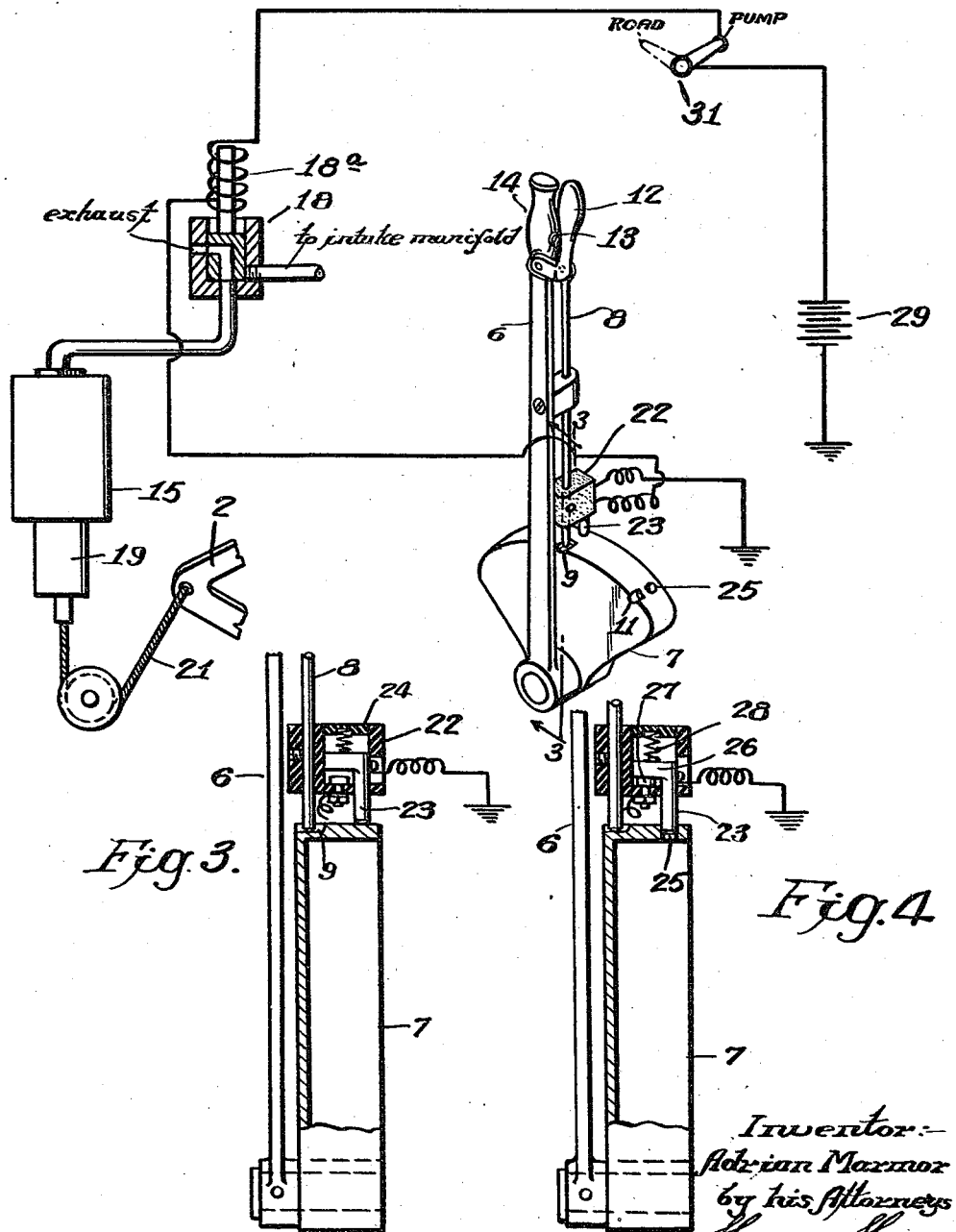

Patented Oct. 24, 1944

2,361,305

UNITED STATES PATENT OFFICE 2,361,305

FIRE ENGINE CONTROL DEVICE

Adrian Marmor, Philadelphia, Pa., assignor to The Hale Fire Pump Co., Inc., Conshohocken, Pa., a corporation of Pennsylvania Application May 1, 1942, Serial No. 441,398

8 Claims. (Cl. 180—53)

This invention relates primarily to automotive fire engines, and a principal object of the invention is to provide convenient and substantially fool-proof means for selectively connecting the motor, which constitutes the single power plant, with the vehicle drive means and the pump transmission.

It is of particular importance in a fire engine of this class that the means for changing over the motor from the vehicle drive to the pump drive shall be such as to afford a rapid shift, together with positive assurance that the prime mover shall not inadvertently be connected with the vehicle driving means during the changeover or after the operator has left the driver's seat to operate the pump at the pump control position.

The present invention provides a control mechanism of this character.

In the attached drawings:

Figure 1 is a more or less diagrammatic view in perspective illustrating a fire engine equipped with a control mechanism made in accordance with my invention;

Fig. 2 is a diagrammatic view illustrating the mode of operation of the device;

Fig. 3 is a section on the line 3—3, Fig. 2;

Fig. 4 is a sectional view corresponding to Fig. 3 but showing the clutch control lever in a different position of adjustment, and Fig. 5 is a fragmentary sectional elevational view illustrating the details of the said clutch.

With reference to the drawings, 1 is the gear shift lever and 2 the clutch pedal which constitutes the conventional means for connecting the power plant of the automotive vehicle with the propeller shaft 3 of the latter. 4 is the fire pump which is carried in the vehicle in usual manner, and means is provided in the form of a clutch 5 for selectively connecting the propeller shaft 3 with the pump 4 or with a second propeller shaft 32, see Fig. 5, which extends to the rear axle and to the driving wheels of the vehicle. In the present instance, the clutch 5 is operated by a hand lever 6 at the side of the vehicle, the lever assembly comprising a quadrant 7 and a locking rod 8 which moves with the lever and which is adapted to engage in notches 9 and 11 in the quadrant to thereby retain the lever 6 in each of two positions of adjustment, as hereinafter described. The locking rod may be operative to retain the lever in more than two positions of adjustment, but the two shown are sufficient for an adequate disclosure of the invention. The locking rod 8 is elevated to release its lower end from the notches 9 and 11 through the medium of a conventional spoon grip 12, and a spring 13 confined between the grip 12 and the handle 14 of the lever 6, or otherwise suitably arranged, exerts resilient pressure tending to hold the locking rod 8 in the relatively depressed position in which it is engageable in the said notches.

The lever 6 is operatively connected to the clutch 5 through a connecting rod 33. This rod is connected to a slidable fork (see Fig. 5) which engages a gear 35 splined to the shaft 3 as illustrated. The gear 35 is adapted in a given position of adjustment to mesh with the pump drive gear 36 and thereby to connect the shaft 3 to the pump. In Figs. 1 and 5 the parts are shown in the pump drive position. When the gear 35 is in this position, a clutch element 37, which in effect is an integral part of the gear, is disengaged from a companion clutch element 38 on the end of the shaft 32, which as previously set forth extends to the driving wheels of the vehicle. When the fork 34 is shifted to the left, as viewed in Fig. 5, which occurs when the lever 6 in Fig. 1 is shifted to the right, it carries with it the gear 35 and the clutch element 37 so that the latter engages the companion element 38 and the gear 35 is disengaged from the gear 36. The shaft 3 is thereby disconnected from the pump and connected to the shaft 32. This is a common type of clutch and the details thereof form no part of the present invention.

Operatively connected with the clutch pedal 2 is a vacuum cylinder 15 which is connected through a duct 16 with the intake manifold 17 of the vehicle motor. Connected in the duct 16 and controlling connection of the cylinder 15 with the said manifold is a solenoid valve 18. The solenoid 18a when energized in the manner hereinafter described actuates the valve to connect the cylinder 15 with the manifold 17, thereby creating in the tank a vacuum which elevates a plunger 19 operatively associated with the cylinder in known manner, and thereby through a cable 21 retracts the clutch pedal 2 so as to release the clutch. When the solenoid valve 18 is deenergized, see Figure 2, the valve moves downwardly to disconnect the cylinder from the manifold and at the same time opens the tank to the atmosphere so as to destroy the vacuum, thereby permitting the clutch pedal 2 to return to the normal position in which the clutch is engaged. It will be noted that when the valve 18 is deenergized, the vacuum cylinder 15 and plunger 19 have no effect upon the operation of the clutch pedal 2 in the conventional manner. It is to be noted also that either the air suspended or vacuum suspended type of vacuum cylinder may be used without altering the principle of the device.

In Figs. 1 and 2, the lever 6 is shown in the position wherein the pump is operatively connected with the propeller shaft 3, and in this position the clutch 5 is also adjusted to disengage the propeller shaft 3 from the driving wheels of the vehicle. When the lever 6 is moved to the right, as viewed in Fig. 2, to the position wherein the locking rod 8 is engaged in the notch 11, the clutch 5 is actuated to disconnect the pump from the propeller shaft and to connect the said shaft with the drive wheels for normal road operation of the vehicle.

Carried by the rod 8 and movable with the latter is a switch unit 22. This switch comprises an actuating element in the form of a pin 23 which projects downwardly from the under side of the housing 24 of the unit toward the upper surface of the segment 7. When the lever 6 is in the road position in which, as previously described, the locking rod 8 engages the notch 11, the depending end of the pin 23 extends freely through an aperture 25 in the top of the segment which permits the switch 22 to close. This is best illustrated in Fig. 4, wherein it will be noted that the inner end 26 of the pin 23 forms one of the contact elements of the switch, the other element being relatively fixed in the switch housing and being designated by the reference numeral 27. A spring 28 engages the upper end of the pin 23 and tends to hold this element in a depressed position in which its inner end portion 26 engages the element 27, as illustrated, thereby closing the switch. When the lever 6 is in the pump position, wherein the locking rod 8 occupies the notch 9, the pin 23 engages the upper surface of the segment 7 and is thereby prevented from moving downwardly to an extent closing the switch. The switch thus remains open, as illustrated in Fig. 3, when the lever 6 is in the pumping position.

As shown in Fig. 2, the switch 22 constitutes an element of an electric circuit which includes the actuating solenoid 18a of the valve 18 and a source of electric current 29, which may, for example, be the motor ignition battery. Also connected in the circuit is a switch 31, this switch having two positions which in the present instance are marked respectively "road" and "pump." In the road position, the switch 31 leaves the aforesaid circuit open, but when the switch is in the position shown in full lines in Fig. 2, the switch is closed to complete the circuit, dependent, of course, upon the position of the switch 22. It will be apparent that in order to close the said circuit so as to energize and actuate the solenoid valve 18, it is necessary that both the switches 22 and 31 be closed. This can occur only when the lever 6 is in the road position with the locking rod 8 released, or when the said rod 8 is elevated to an extent such that its lower end is above or at the level of the upper surface of the segment 7. In other words, the switch 22 is open only when the lever 6 is in the pump position with the rod 8 released and entered in the notch 9.

In operation of the device, the operator of the engine upon reaching the site of a fire will throw the switch 31 to the pump position, as shown in Fig. 1. The lever 6 is now in the road position in which the locking rod 8 occupies the notch 11 and in which also the switch 22 is closed. Closing of the switch 31 will, therefore, complete the circuit of and energize the solenoid 8a with resulting disengagement of the clutch 2. The gear shift lever 1 may be left in gear at this stage. The operator may then dismount and shift the lever 6 into the pump position, as shown in the drawings. During this shifting movement, the switch remains closed, since the entire switch mechanism has been elevated with the rod 8, leaving the pin 23 in the depressed position in engagement with the contact element 27. When the lever 6 has reached the pump position and the locking rod 8 is released for entrance into the notch 9, the switch housing will be lowered to an extent sufficient to bring the pin 23 into engagement with the top of the segment 7 and sufficiently far below this position to separate the inner end 26 of the pin 23 from the contact element 27. The arrangement is such that when, and only when, the locking rod 8 occupies the notch 9 will the switch 22 be opened. The opening of the switch immediately deenergizes the solenoid of the valve 18, and permits this valve to close, thereby disconnecting the cylinder 15 from the manifold 17 and releasing the clutch pedal 2, thereby permitting the clutch to close and to connect the propeller shaft 3 with the motor. At this point, the propeller shaft 3 is also connected through the clutch 5 with the pump 4 so that the pump is now in operation. Subsequent elevation of the rod 8 to an extent releasing the lever for return to the road position will result immediately in a closing of the switch 22, reenergization of the solenoid 18a, and retraction of the clutch pedal 2. This action occurs before the lever 6 can be moved from the pump position; and after the lever 6 has been returned to the road position, the pedal 2 cannot be released to re-engage its clutch until the switch 31 is also shifted to the road position, which actuation of the switch 31 occurs only when the operator is in the driver's seat.

I claim:

1. In a fire engine of the motor-propelled vehicle type, a pump carried by the vehicle, a propeller shaft, a normally engaged clutch for controlling connection of the shaft with the motor, and a second clutch for selectively controlling connection of the shaft with the pump and with the vehicle drive wheels; power-actuated means for disengaging the first-named clutch, a pair of independently adjustable control elements for said power actuated means, said elements being operative jointly when both are in given positions of adjustment to actuate the disengaging means, and each being operative individually when in another position to prevent actuation of the disengaging means, means operative when the second-named clutch connects the propeller shaft with the said drive wheels for retaining one of said control elements in the first of said positions of adjustment, whereby if the second control element is also in the first position the said power actuated means will be operated to disengage the associated clutch, and means normally operative when the said second clutch connects the propeller shaft with the pump for retaining the first control element in the second of said positions whereby the power actuated means is rendered inoperative to disengage the clutch irrespective of the position of the other control element.

2. In a fire engine of the motor-propelled vehicle type, a pump carried by the vehicle, a propeller shaft, a normally engaged clutch for controlling connection of the shaft with the motor, and a second clutch for selectively controlling connection of the shaft with the pump and with the vehicle drive wheels; power-actuated means for disengaging the first-named clutch, a pair of independently adjustable control elements for said power actuated means, said elements being operative jointly when both are in given positions of adjustment to actuate the disengaging means, and each being operative individually when in another position to prevent actuation of the disengaging means, means operative when the second-named clutch connects the propeller shaft with the said drive wheels for retaining one of said control elements in the first of said positions of adjustment, whereby if the second control element is also in the said first position, the said power actuated means will be operated to disengage the associated clutch, means normally operative when the said second clutch connects the propeller shaft with the pump for retaining the first control element in the second of said positions, whereby the power actuated means is rendered inoperative to disengage the clutch irrespective of the position of the other control element and manual means for adjusting the said first control element to the first of said positions while the said clutch connects the propeller shaft with the pump.

3. In a fire engine of the motor-propelled vehicle type, a pump carried by the vehicle, a propeller shaft, a normally engaged clutch controlling connection of the shaft with the motor, and a second clutch for selectively controlling connection of the shaft with the pump and with the vehicle drive wheels; power-actuated means for disengaging the first-named clutch, a pair of independently adjustable control elements for said power actuated means, said elements being operative jointly when both are in given positions of adjustment to actuate the disengaging means, and each being operative individually when in another position to prevent actuation of the disengaging means, and means automatically operative when the second-named clutch is actuated to connect the propeller shaft with the said drive wheels for adjusting one of the control elements to the first-named position, thereby to insure disengagement of the first named clutch when the other of the control elements is also in the first named position.

4. In a fire engine of the motor-propelled vehicle type, a pump carried by the vehicle, a propeller shaft, a normally engaging clutch controlling connection of the shaft with the motor, and a second clutch adapted in different adjusted positions to connect the shaft respectively with the pump and with the vehicle drive wheels; means for locking the second-named clutch in the said respective positions, power-operated means for disengaging the first-named clutch, a pair of independently adjustable control elements for said power actuated means, said elements being operative jointly when both are in given positions of adjustment to actuate the disengaging means, and each being operative individually when in another position to prevent actuation of the disengaging means, and means for operatively connecting one of said control elements with the said locking means whereby when the second clutch is locked in position connecting the propeller shaft with the drive wheels the said control element automatically assumes the first of said positions, thereby to insure disengagement of the first named clutch when the second control element is also in the first of said positions, and when the said clutch is locked in position to connect the propeller shaft with the pump, the first control element is automatically adjusted to the second of said positions, thereby to effect engagement of the first named clutch independently of the other control elements.

5. In a fire engine of the motor-propelled vehicle type, a pump carried by the vehicle, a propeller shaft, a normally engaged clutch for controlling connection of the shaft with the motor, and a second clutch adapted in different adjusted positions to connect the shaft respectively with the pump and with the vehicle drive wheels; a manual actuator for said second clutch, means operatively associated with said actuator for locking the clutch in the respective positions of adjustment, power-operated means for disengaging the first-named clutch, a pair of independently adjustable control elements for said power actuated means, said elements being operative jointly when both are in given positions of adjustment to actuate the disengaging means, and each being operative individually when in another position to prevent actuation of the disengaging means one of said control elements being operatively connected with said locking means, means automatically operative when the said locking means is actuated to lock the clutch in position to connect the propeller shaft with the said drive wheels to retain the said associated control element in the first of said positions of adjustment, whereby when the second of the control elements is in the said first position the said power operated means will be actuated to disengage the first named clutch, means automatically operative when the locking means is actuated to retain the clutch in position to connect the propeller shaft with the pump for adjusting th said associated control element to the second of said positions of adjustment, whereby the said power operated means is rendered inoperative to disengage the first named clutch irrespective of the position of the said second control element and means operative when the locking means is adjusted to release the clutch from the last-named position to automatically return the said associated control element to the first of said positions, whereby when the second control element is also in the first of said positions, the power operated means will be actuated to disengage the first named clutch.

6. In a fire engine of the motor-propelled vehicle type, a pump carried by the vehicle, a propeller shaft, a normally engaged clutch for controlling connection of the shaft with the motor, and a second clutch for selectively controlling connection of the shaft with the pump and with the vehicle drive wheels; means operated from the vehicle motor for disengaging the first-named clutch, means including two separate electric switches for actuating the disengaging means, said actuating means being operative only when both of said switches are simultaneously in given positions of adjustment, and each of said switches being operative in another position of adjustment to render the said means inoperative, and means automatically operative to adjust one of said switches to the first-named position when the second of said clutches is adjusted to connect the propeller shaft with the said drive wheels, whereby when the other of said switches is also in the first named position the said disengaging means will be actuated to disengage the first named clutch.

7. In a fire engine of the motor-propelled vehicle type, a pump carried by the vehicle, a propeller shaft, a normally engaged clutch for controlling connection of the shaft with the motor, and a second clutch for selectively controlling connection of the shaft with the pump and with the vehicle drive wheels; motor-actuated means for disengaging the first-named clutch, a lever for actuating the second-named clutch, a source of energy for said motor means, means including two separate electric switches operative only when both are simultaneously in given position of adjustment to operatively connect the motor means with the said source, each of said switches being operative in another position of adjustment to prevent said connection, a locking element adjustable on said lever and constituting a movable support for one of said switches, said switch being normally in the first-named of said positions, and means operatively associated with said locking element for adjusting the switch to the second of said positions when the switch lever is in position to connect the propeller shaft with the pump.

8. In a fire engine of the motor-propelled vehicle type, a pump carried by the vehicle, a propeller shaft, a normally engaged clutch for controlling connection of the shaft with the motor, and a second clutch for selectively controlling connection of the shaft with the pump and with the vehicle drive wheels; motor-actuated means for disengaging the first-named clutch, a lever for actuating the second-named clutch, a source of energy for said motor means, means including two separate electric switches operative only when both are simultaneously in given positions of adjustment to operatively connect the motor means with said source, each of said switches being operative in another position of adjustment to prevent said connection, a locking element adjustable on said lever and constituting a movable support for one of said switches, means for normally retaining the switch in the first of said positions of adjustment, a member operatively associated with the lever and having a notch for reception of the locking element when the lever is in position to connect the shaft with the pump whereby to lock the lever in said position, a switch-actuating element arranged to engage said member when the locking element is entered in said notch to thereby adjust the switch to the said second position of adjustment, whereby the said motor means is disconnected from the said energy source and rendered inoperative to disengage the associated clutch, a notch arranged to receive said locking element when the lever is in position to connect the shaft with the vehicle drive wheels whereby to lock the lever in the said position, said switch-actuating element being free when the said locking element enters the last-named notch whereby the switch remains in the first-named of said positions, thereby vesting control of the operation of said motor means in the other of the electric switches.

ADRIAN MARMOR.